United States Patent
Perkins

(10) Patent No.: US 9,722,415 B2
(45) Date of Patent: Aug. 1, 2017

(54) REGULATING TEMPERATURE ON AN ACTUATOR

(71) Applicant: Dresser, Inc., Addison, TX (US)

(72) Inventor: Andrew Logan Perkins, Houston, TX (US)

(73) Assignee: Dresser, Inc., Addison, TX (US)

( * ) Notice: Subject to any disclaimer, the term of this patent is extended or adjusted under 35 U.S.C. 154(b) by 160 days.

(21) Appl. No.: 14/803,152

(22) Filed: Jul. 20, 2015

(65) Prior Publication Data

US 2017/0025848 A1    Jan. 26, 2017

(51) Int. Cl.
| | |
|---|---|
| G05B 5/00 | (2006.01) |
| H02H 7/08 | (2006.01) |
| H02H 1/04 | (2006.01) |
| H02H 3/00 | (2006.01) |
| H02H 7/093 | (2006.01) |
| H02K 7/116 | (2006.01) |
| H02K 11/20 | (2016.01) |
| H02K 11/21 | (2016.01) |
| H02K 11/25 | (2016.01) |

(52) U.S. Cl.
CPC .......... *H02H 7/093* (2013.01); *H02K 7/116* (2013.01); *H02K 11/20* (2016.01); *H02K 11/21* (2016.01); *H02K 11/25* (2016.01); *H02K 2213/06* (2013.01)

(58) Field of Classification Search
CPC .............................. H02H 7/093; H02K 7/003
USPC ........................................................ 318/461
See application file for complete search history.

(56) References Cited

U.S. PATENT DOCUMENTS

| | | |
|---|---|---|
| 4,785,242 A | 11/1988 | Vaidya et al. |
| 6,097,123 A | 8/2000 | Weiss et al. |
| 6,348,752 B1 | 2/2002 | Erdman et al. |
| 6,400,050 B1 | 6/2002 | Naman et al. |
| 6,420,846 B1 | 7/2002 | Wolfe |
| 7,579,802 B2 | 8/2009 | Boisvert et al. |
| 7,747,146 B2 | 6/2010 | Milano et al. |
| 8,164,293 B2 | 4/2012 | Flanary et al. |
| 2011/0266986 A1* | 11/2011 | Christmann ........ H02P 29/0241 318/400.21 |
| 2012/0008457 A1* | 1/2012 | Neier ...................... A01K 5/004 366/190 |
| 2015/0149100 A1* | 5/2015 | Eisenbeis ............... G01B 7/003 702/58 |

FOREIGN PATENT DOCUMENTS

DE            20011863 U1    11/2000

* cited by examiner

*Primary Examiner* — Erick Glass
(74) *Attorney, Agent, or Firm* — Paul Frank + Collins P.C.

(57) ABSTRACT

A safety device for an actuator that can modulate power to an electric motor in response to a fault condition (e.g., stall). In one embodiment, the actuator can include a motor with a shaft, a sensor disposed in proximity to the shaft, and a control processor coupled with the sensor and the motor. The control processor can be configured to receive a signal from the sensor that conveys operating data that relates to rotation of the shaft, use the operating data to identify a fault condition on the motor, and change the motor from an energized condition to a de-energized condition in response to the fault condition.

20 Claims, 14 Drawing Sheets

REGULATING TEMPERATURE ON AN ACTUATOR

BACKGROUND

Linear and rotary actuators are useful devices to operate material handling and/or flow control equipment. This equipment may be found in hazardous areas and/or used to regulate flow of volatile materials (e.g., combustible gasses and liquids). As such, actuators that pair with this equipment must satisfy certain safety requirements including, for example, safety requirements that define a maximum operating temperature for the device.

SUMMARY

This disclosure relates generally to actuators, with particular discussion about embodiments that are configured to maintain operating temperatures at or below a maximum operating temperature.

Some embodiments disclosed herein address problems with actuators that employ electric motors. These embodiments can monitor physical movement of components to detect problematic operation of the electric motor. The components can include a shaft on the electric motor. Should the motor seize or lock, the embodiments can de-energize the electric motor to keep the temperature of the actuator in compliance with safety requirements.

In light of the foregoing, the embodiments herein may incorporate elements and features, one or more of the elements and features being interchangeable and/or combinable in various combinations, examples of which may include:

An actuator can include a first shaft having a first position and a second position, a motor with a second shaft coupled with the first shaft, a sensor disposed in proximity to the second shaft; and a control processor coupled with the sensor and the motor. The control processor can be configured to receive a signal from the sensor that conveys operating data that relates to rotation of the second shaft use the operating data to identify a fault condition of the motor, and change the motor from a first operating state to a second operating state in response to the fault condition.

The actuator can also be configured wherein the sensor is in a position so that the operating data tracks an annular translation of a location on the second shaft.

The actuator can also be configured wherein the sensor is configured to rotate with the second shaft.

The actuator can also be configured wherein the sensor has a first component and a second component, at least one of which secures to the second shaft and interacts with the other to induce the signal.

The actuator can also include a bushing that rotates with the second shaft, wherein the sensor couples with the bushing.

The actuator can also be configured wherein the control processor further comprises a switch that couples with the motor, wherein the control processor is configured to change the switch from a first state to a second state in response to the fault condition, and wherein the second state corresponds with the second operating state of the motor.

The actuator can also be configured wherein the first operating state is an energized condition and the second operating state is a de-energized condition The actuator can also include a counter coupled with the control processor, wherein the counter is configured to measure a duty cycle, and wherein the control processor is configured to, activate the counter in response to the fault condition and to change the state of the switch from the second state to the first state in response to expiration of the duty cycle.

The actuator can also be configured wherein the control processor is further configured to, use the operating data to determine an annular speed for the second shaft, and compare the annular speed to a threshold speed, wherein the fault condition corresponds with a value for the annular speed that deviates from the threshold speed.

The actuator can also be configured wherein the signal from the sensor comprises a first signal and a second signal, and wherein the control processor is configured to, determine an elapsed time between the first signal and the second signal and to compare the elapsed time to a rotation threshold, wherein the fault condition corresponds with a value for the elapsed time that deviates from the rotation threshold.

An actuator can include a first shaft having a first position and a second position, a motor with a second shaft, a safety device coupled with the motor, the safety device comprising an input/output coupled with the motor and a switch coupled with the input/output, the switch having a first state and a second state, one each that allows an electrical signal to impress on the input/output and that prevents the electrical signal to impress on the input/output. The safety device can be configured to track an annular translation of a location on the second shaft, determine a fault condition of the motor that relates to the annular translation, and change the state of the switch from the first state to the second state in response to the fault condition.

The actuator can also include a sensor coupled with the location on the second shaft, wherein the sensor is configured to generate a signal that defines operating data that relates to the annular translation, and wherein the safety device is configured to use the operating data to calculate the annular translation.

The actuator can also be configured wherein the annular translation quantifies an annular speed for the location on the second shaft.

The actuator can also be configured wherein the signal from the sensor comprises a first signal and a second signal, and wherein the controller is configured to determine an elapsed time between the first signal and the second signal and to compare the elapsed time to a rotation threshold, wherein the fault condition corresponds with a value for the elapsed time that deviates from the rotation threshold.

The actuator can also be configured wherein the sensor is configured to rotate with the second shaft.

The actuator can also be configured wherein the sensor has a first component and a second component, at least one of which secures to the second shaft and interacts with the other to induce the signal.

A method of operating an actuator can include tracking an annular translation for a location on a shaft of a motor, detecting a fault condition of the motor that relates to the annular translation, and changing the motor from an energized condition to a de-energized condition in response to the fault condition.

The method can also include changing a switch from a first state to a second state in response to the fault condition, and wherein the second state corresponds with the de-energized condition of the motor.

The method can also include starting a counter in response to the fault condition and changing the switch from the second state to the first state in response to the counter reaching a duty cycle value, wherein the second state corresponds with the energized condition of the motor.

The method can also include receiving a signal that conveys operating data that relates to the annular translation and using the operating data to calculate the annular translation.

BRIEF DESCRIPTION OF THE DRAWINGS

Reference is now made briefly to the accompanying drawings, in which.

Figure 1:
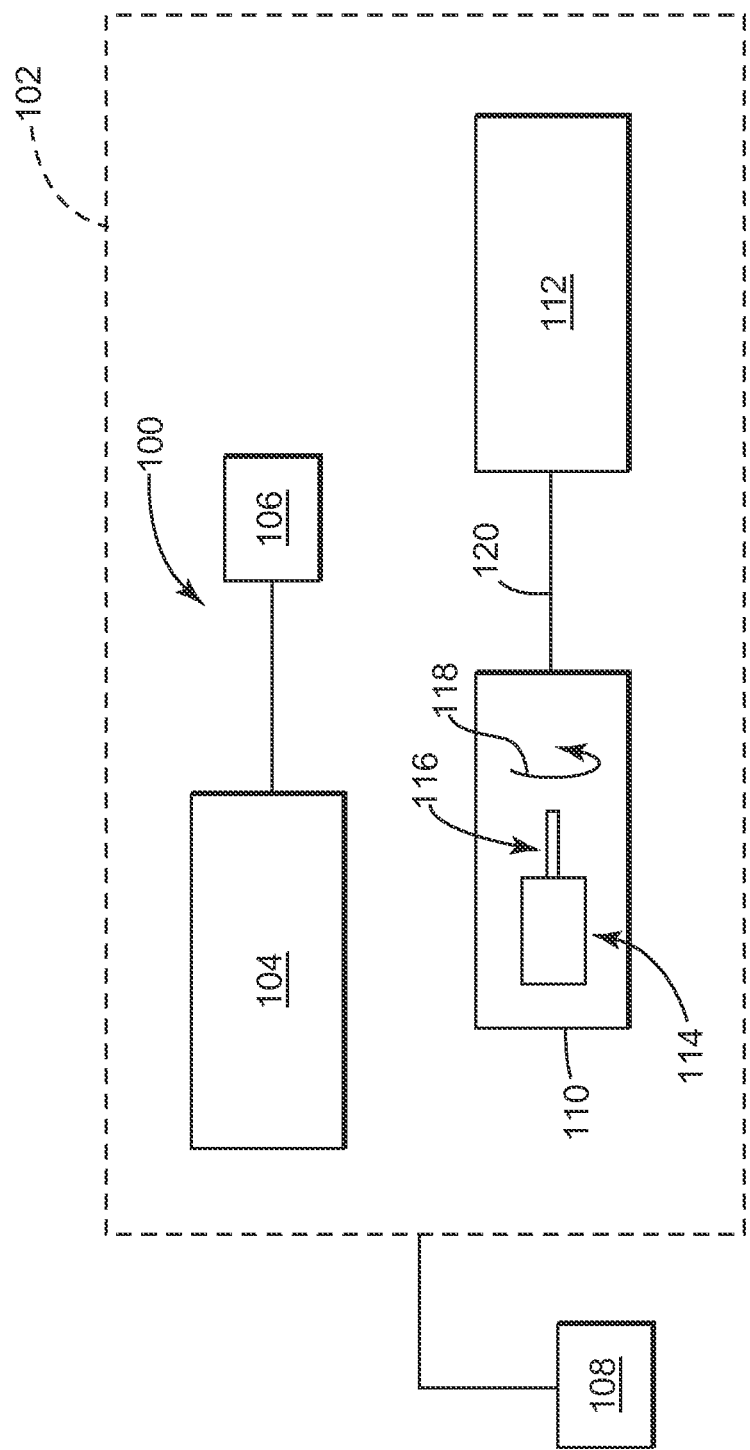
FIG. 1 depicts a schematic, block diagram of an exemplary embodiment of a safety device in use on an example of an actuator.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and can be modified by, for example, reordering, adding, removing, and/or altering the individual stages.

DETAILED DESCRIPTION

The discussion below describes embodiments of a safety device that can prevent build-up of excess heat on an actuator. These embodiments can be configured to characterize mechanical movement on the actuator. The safety device can use this mechanical movement to detect faulty operation, or a "fault condition," on an electric motor. Operating the electric motor in the fault condition may result in excess heat that raises the temperature of the electric motor and/or the actuator in general. However, the safety device can modulate power to the electric motor in response to the fault condition to prevent build-up of thermal energy and excess heat. The safety device can keep the temperature of the electric motor and actuator at a safe temperature, as defined by hazardous area threshold levels set out by safety standards and requirements. Other embodiments are within the scope of the disclosed subject matter.

FIG. 1 illustrates, schematically, an exemplary embodiment of a safety device 100. This embodiment can couple with and/or integrate as part of an actuator, generally identified by the numeral 102. The safety device 100 can include a control processor 104 that couples with a sensor member 106 (also, "sensor 106"). The control processor 104 can also couple with a power source 108 that can supply an electrical signal with properties (e.g., direct current (DC), alternating current (AC), voltage, etc.) sufficient to power a motor member 110. In one implementation, the motor member 110 can translate an actuator member 112 to create useful work. The motor member 110 may include a motive unit 114 that can turn a shaft 116 in response to the electrical signal, as generally indicated by the arrow enumerated 118. A mechanical coupling 120 can transfer rotation 118 of the shaft 116 to the actuator member 112. For example, this configuration can move the actuator member 112 to operate a valve assembly (not shown) to open and close a valve. The valve assembly may connect with a process line (e.g., a pipeline) to regulate flow of material (e.g., gasses and liquids). Examples of such process lines are found in chemical facilities, oil & gas production facilities, refineries, and like installations and heavy industries. In one implementation, the actuator 102 may be used in ventilation applications to control airflow dampers. This disclosure recognizes numerous applications that define hazardous areas that require safe handling of operational temperature and related fault conditions on the actuator 102.

The safety device 100 can be configured to maintain temperature of the actuator 102 below certain threshold levels. In some embodiments, the sensor member 106 can generate a signal that conveys operating data that relates to mechanical movement of one or more components on the actuator 102. This mechanical movement may include translation of the components, as well as vibration, oscillation, and the like. The signal may also convey operating data about other aspects of the operation of the actuator 102. For example, the signal may identify values for temperature, stress, strain, and like properties of the components on the actuator 102 that may be useful to identify faulty operation and/or fault conditions.

The sensor member 106 may embody devices that are sensitive to these properties. These devices may include Hall-effect sensors and giant magnetoresistance (GMR) sensors to detect movement of the shaft 116. Other devices also could reasonably quantify the movement of components of the actuator 102. These other devices include, optical sensors, photo-sensitive sensors, capacitive sensors, and like devices that can identify the proximity and/or position of one part relative to another part (e.g., optically-sensitive sensors).

The sensor member 106 can be arranged in proximity to the shaft 116 so that the operating data relates to a location on the shaft 116. Movement of other components might also be suitable including, e.g., movement of actuator member 112, the mechanical coupling 120, etc. In one implementation, the control processor 104 can use the operating data from the sensor member 106 to detect a fault condition that indicates that operation of the motive unit 114 is contrary to normal. For example, the control processor 104 may determine a value for the annular translation of a location on the shaft. Changes in this annular translation may signal that the fault condition is present on the motive unit 114. In response to the fault condition, the control processor 104 can reduce (and/or remove) the electrical signal from the motor member 110 to a level that is insufficient to cause build-up of excess heat on the motive unit 114. This feature can maintain operating temperatures on the actuator 102 at and/or below threshold levels that can be dangerous in hazardous areas.

Figure 2:
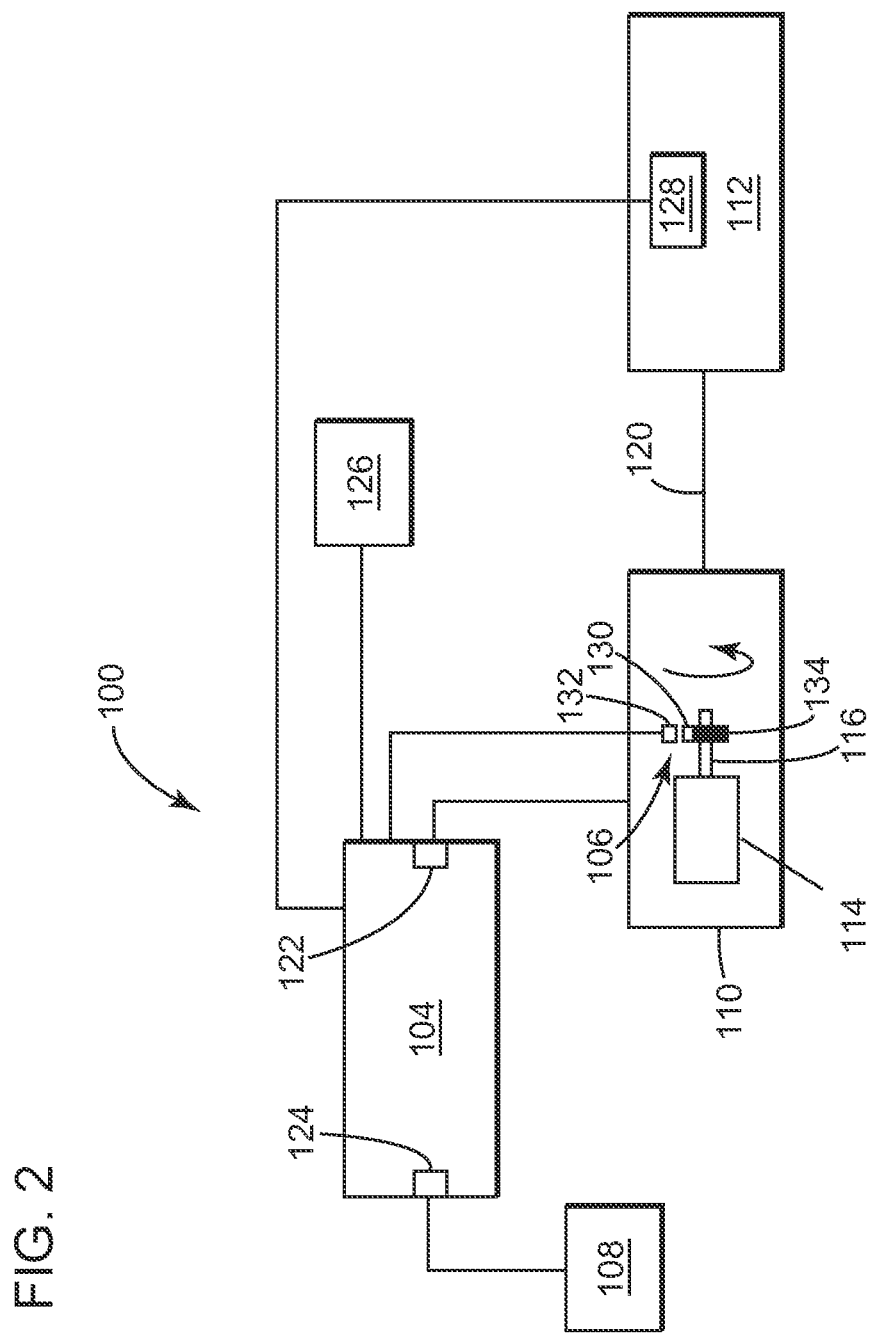
FIG. 2 depicts a schematic, block diagram of an example of the safety device of FIG. 1.

FIG. 2 depicts a schematic diagram of an example of the safety device 100. The control processor 104 can have one or more input/outputs (e.g., a first input/output 122 and a second input/output 124). The input/outputs 122, 124 can couple the control processor 104 with the motor member 110 and the power source 108, respectively. The control processor 104 can also couple with other sensors (e.g., a thermal sensor 126 and a travel sensor 128). The thermal sensor 126 can generate a signal that conveys operating data that reflect a measured temperature on the actuator 102. Examples of the thermal sensor 126 include thermostatic limit switches, thermocouples, thermistors, or like elements, one or more of which can mount inside of the motor member 110 or other part of the actuator 102 as desired or as set forth by design specifications. The travel sensor 128 can generate a signal that conveys operating data that reflect a position (e.g., a first position and a second position) of the actuator member 112. This operating data may be helpful to identify that the actuator member 112 has reached the outer extent of its travel.

The sensor member 106 can be configured to reside in proximity and/or proximate the shaft 116. In some embodiments, the sensor member 106 can have one or more sensor components (e.g., a first sensor component 130 and a second sensor component 132). Examples of the sensor components 130, 132 can embody various types of sensors including proximity sensors, optical sensors, photo-sensitive sensors, capacitive sensors, and like devices that can identify the proximity and/or position of one part relative to another part. In one implementation, the sensor components 130, 132 may reside proximate the shaft 116. For proximity sensors, the sensor components 130, 132 may correspond with a transmitter and a receiver, wherein the transmitter generates a radiative output (e.g., magnetic field, light, etc.) to induce the signal in the transmitter. In one implementation, the first sensor component 130 may secure to the shaft 116 so that as the shaft 116 rotates, the first sensor component 130 changes position relative to the second sensor component 132. A mounting member 134 may be used to affix the first sensor component 130 to the shaft 116. Examples of the mounting member 134 may embody a bushing, collar, or like implement. The mounting member 134 may have a body that at least partially circumscribes the shaft 116. The body may be made of plastic or non-metallic material to avoid interfering with operation of the sensor components 130, 132. The body can be molded to incorporate the first sensor component 130 and have apertures configured to receive fasteners (e.g., screws, bolts, etc.). When assembled, these fasteners can lock the mounting member 134 into position on the shaft 116, although more permanent placement of the mounting member 134 may use other techniques (e.g., welding, adhesives, etc.).

The second sensor component 132 can couple with structure on the actuator 102 to affix its position relative to the first sensor component 130. This structure may include a housing that encloses parts of the motor member 110. A bracket may be used to receive the second sensor component 132. This bracket may couple with the housing using, e.g., fasteners, welds, adhesives, and the like. In lieu of the bracket, the housing may incorporate features to affix the second sensor component 132 in position relative to the first sensor component 130. This position can be in close proximity to the first sensor component 130 to allow the sensor components 130, 132 to interact with one another. In one implementation, the signal from the sensor member 106 corresponds with movement of the first sensor component 130 relative the second sensor component 132. The signal may define a change in voltage from a first (or low) level to a second (or high) level.

Some embodiments can detect various fault conditions using the signals from the sensor member 106. Broadly, the fault conditions may indicate changes in operation of the motive unit 114 that can, or are likely to, increase temperature in excess of certain safety thresholds. One exemplary change in operation may reflect seizing of the motive unit 114 that prevents rotation of the shaft. In another change in operation, the shaft may rotate at one or more speeds that are different (e.g., slower) than the speed(s) related to normal operation. Other operation that may indicate the increase in temperature may include jerking and/or halting rotation in one or more annular directions, oscillation and/or annular cycling of the shaft between two annular positions, and the like.

During operation, the control processor 104 can change the state of the first input/output 122 in response to the fault condition. These states may correspond to different operating conditions of the motive unit 114 including, for example, conditions that reflect the motive unit 114 is on, the motive unit 114 is off, the motive unit 114 travels at different speeds (e.g., slower, faster, etc.), and/or some other alternation in the operation of the motive unit 114. The states can include a first state (also, "power on state") and a second state (also, "power off state"), one each that can reflect the presence or absence of the electrical signal at the first input/output 122. In the first state, the electrical signal impresses on the first input/output 122. The first state corresponds with the motive unit 114 in the energized condition. In the second state, the electrical signal is absent (and/or reduced) from the first input/output 122. The second state corresponds with the motive unit 114 in the de-energized condition. Absent the electrical signal, the motive unit 114 may fail to build-up excess heat that might damage the windings found in AC and/or DC electric motors (and like devices). In some embodiments, the control processor 104 can modulate the electrical signal to the first input/output 122 according to a duty cycle. This feature can change the first input/output 122 between the first state and the second state, which corresponds with the motive unit 114 changing between the energized condition and the de-energized condition. Such operation may last until the fault condition is cleared and/or the actuator 102 is repaired or decommissioned from its present application.

Figure 3:
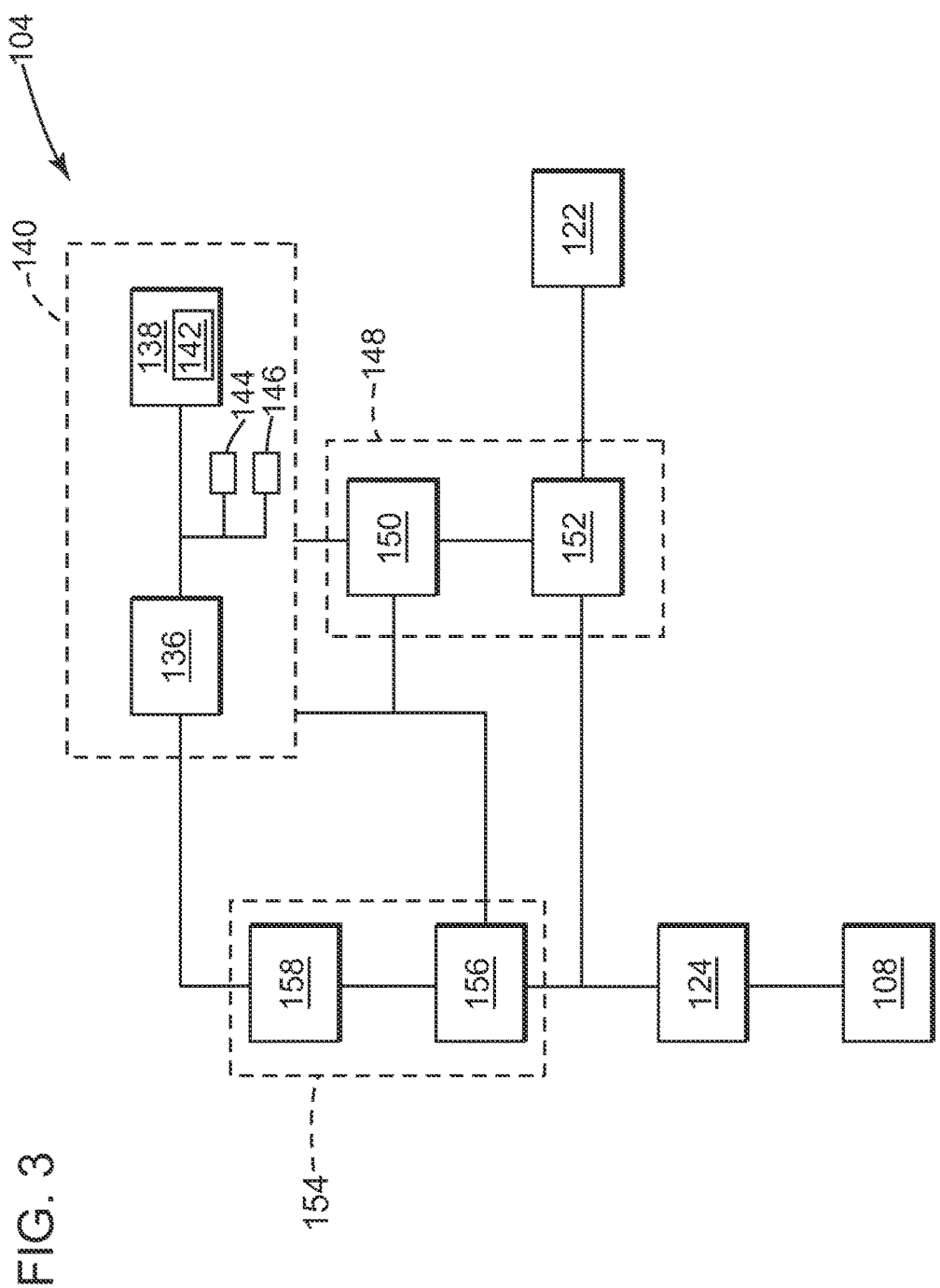
FIG. 3 depicts a schematic, block diagram of a control processor for use in the actuator of FIG. 1.

FIG. 3 depicts a schematic diagram of an example of the control processor 104. This example can include a processor member 136 and a storage memory 138, which may be a separate component or integrate with the processor member 136 as part of an integrated processor 140. This disclosure contemplates that some embodiments may utilize a substrate (e.g., a printed circuit board) to support the members 136, 138, 140 and other discrete elements. The storage memory 138 may include one or more executable instructions 142 in the form of computer-implemented programs (e.g., software, firmware, etc.). In some embodiments, the integrated processor 140 can include a clock 144 that accurately measures real and/or current time. The clock 144 may be capable of non-volatile operation in absence of power. Separately, the integrated processor 140 may include one or more counters (e.g., a first counter 146). The counters 146 can be used to control a power-off state duration, which enforces the operational duty cycle (noted above) as well as duration of the fault condition that persists on the motive unit 114, as noted more below. In one example, the counters 146 can also measure an elapsed time between signals from the sensor member 106 (FIG. 2). This feature may be effective to track the annular translation of the shaft 116.

As also shown in FIG. 3, some embodiments can include a relay member 148 with a relay driver 150 that operates a relay switch 152. The relay driver 150 may receive command signals from the integrated processor 140. The relay switch 152 can be interposed between the input/outputs 122, 124. In this way, operation of the relay switch 152 between a first state and a second state can result in the power on state and the power off state of the input/outputs 122, 124. Examples of the relay member 148 may be implemented as an electro-mechanical relay, transistors, triacs, SCRs, and combinations and derivations thereof. In one example, the control processor 104 can also have a power supply 154 with one or more members (e.g., a first power supply member 156 and a second power supply member 158). The first power supply member 156 can couple with the second input/output 124 to receive the electrical signal from the power source 108. In use, the first power supply member 156 can embody a DC supply that can convert the electrical signal to appropriate form for use by the components (e.g., the integrated processor 140, the relay driver 150, etc.). The second power supply member 158 can embody a battery, a capacitor, or like discrete element (and/or combination of discrete elements). Such discrete element(s) can couple with the integrated processor 140 to provide back-up power in lieu of the converted electrical signal from the first power supply member 156. In this way, the integrated processor 140 can maintain non-volatile operation of one or more functions and/or functional elements including, for example, the clock 144 and the counters 146.

Figure 4:
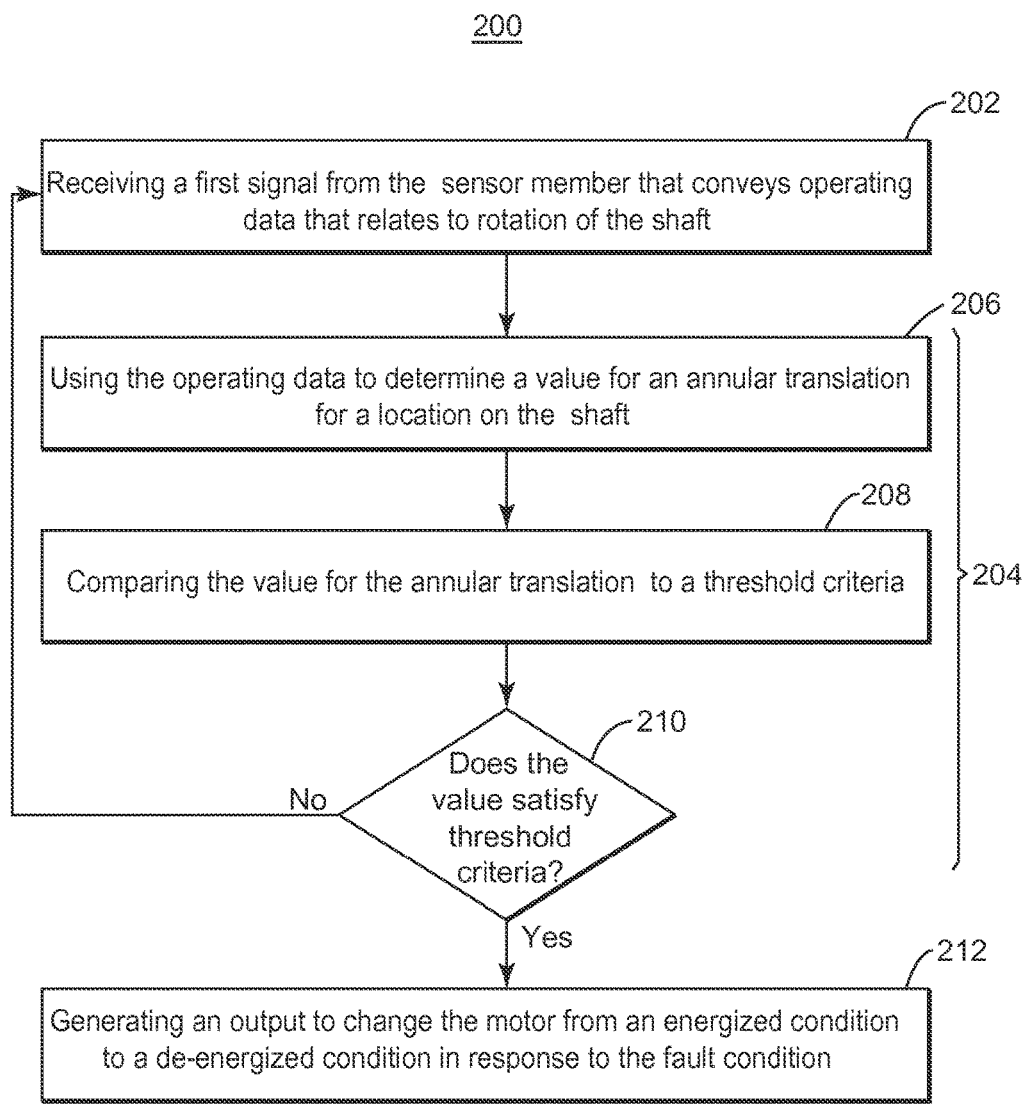
FIG. 4 depicts a flow diagram of an exemplary method for operating the actuator of FIG. 1.
Figure 5:
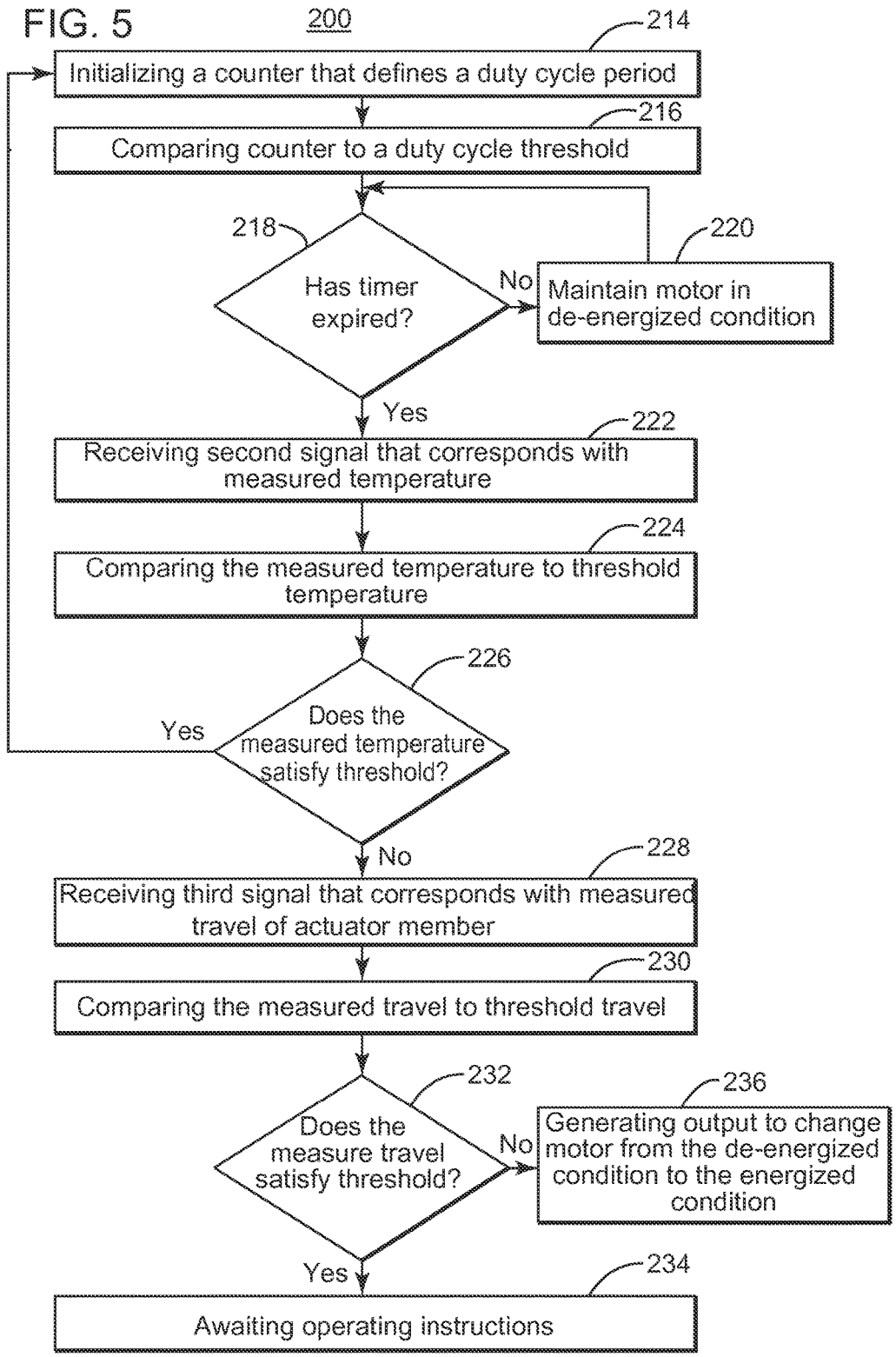
FIG. 5 depicts a flow diagram of an exemplary method for operating the actuator of FIG. 1.

FIGS. 4 and 5 illustrate flow diagrams for exemplary embodiments of a method 200 for operating the safety device 100 to regulate temperature on the actuator 102. These diagrams outline stages that may embody executable instructions for one or more computer-implemented methods and/or programs. The executable instructions may be stored on the storage memory 138 and/or otherwise accessible to processor member 136. For example, the integrated processor 140 may be configured to execute these executable instructions to regulate the electrical signal in a way that prevents thermal overload detrimental to operation of the actuator 102. The stages in these methods can be altered, combined, omitted, and/or rearranged in some embodiments.

In FIG. 4, the method 200 can include, at stage 202, receiving a first signal from the sensor member 106 that conveys operating data that relates to rotation of the shaft 116. The method 200 can also include, at stage 204, using the operating data to detect the fault condition on the motor. In one implementation, the fault condition may relate to the annular translation of the shaft 116. For example, the method 200 may include, at stage 206, using the operating data to determine a value for an annular translation of a location on the shaft and, at stage 208, comparing the value for the annular translation to a threshold criteria and, at 210, detecting the fault condition. If the value does not satisfy the threshold criteria, then the method 200 can continue to track movement of the shaft at stage 202. On the other hand, if the value does satisfy the threshold criteria, then the method 200 can include, at stage 212, generating an output to change the motor from the energized condition to the de-energized condition in response to the fault condition. In other implementations, the output may also slow the motor (e.g., by adjusting power input to the motor), apply a braking mechanism, introduce a cooling mechanism (e.g., fluid) to the motor, and/or cause some type of functionality that will help to modulate heat and thermal build-up on the motor, as desired.

At stage 202, the method 200 can receive operating data that relates directly to mechanical movement of the shaft 116. The first signal can arise from interactions between the sensor components 130, 132 as discussed herein. The operating data that relates to the first signal may be helpful to track the movement or annular translation of a location on the shaft 116. In one implementation, the second sensor component 132 can generate one or more pulses whenever the first sensor component 130 comes in close proximity to the second sensor component 132. This pulse may indicate different levels (e.g., a high level or a low level) of voltage at the control processor 104.

At stage 204, the method 200 can use the operating data to detect the fault condition. The fault condition can indicate that the motive unit 114 is stalled and/or locked. These conditions can prevent rotation of the shaft 116. In turn, the windings of the motive unit 114 will generate thermal energy under constant power. This feature can increase temperatures on the actuator 102 that are above and/or outside acceptable operating limits.

At stage 206, the method 200 can determine a value for the annular translation of the location on the shaft 116. Examples of this value may relate to displacement and/or annular speed for the "tracked" location. In one implementation, the method 200 may include one or more stages for tracking the annular translation of the location. These stages utilize the signals from the sensor 106. For example, the method 200 may include one or more stages for determining an elapsed time between a first pulse (or first signal) and a second pulse (or second signal) from the second sensor component 132. These stages may also include stages for activating a counter (e.g., the counters 146) and de-activating the counter in response to the first pulse and the second pulse, respectively. Use of the counter can measure the elapsed time between pulses. The method 200 may also include one or more stages for storing and/or retaining the value of the counter in, e.g., storage memory 138. The method 200 can also include stages for accessing the storage memory 138 to retrieve the value (and/or other operating data, where applicable). In some embodiments, the method 200 may include one or more stages for calculating the annular speed over one complete rotation of the shaft 116. These calculations may take into consideration certain variables including the elapsed time and one or more dimensions (e.g., diameter) of the shaft 116.

At stage 208, the method 200 can compare the value for the annular translation to the threshold criteria. Examples of the threshold criteria may identify an allowable rotation period, an allowable annular speed, or like identifier that quantifies the rotation of the location on the shaft 116. Values for the identifiers may be fixed or pre-determined as part of factory set-up or calibration. These values may be stored in the storage memory 138. Such values may be amenable to updates via user interface and/or upgrades to the executable instructions. In one implementation, the method 200 may include one or more stages for comparing the elapsed time between pulses to a rotation threshold. Examples of the rotation threshold may identify a maximum value and/or a minimum value for the time required between the pulses.

At stage 210, the method 200 can determine whether the value for the annular translation satisfies the threshold criteria. The method 200 may include one or more stages for identifying the relative position (e.g., greater than, less than, equal to, not equal to, etc.) between the value and the threshold criteria. When the motive unit 114 is in the fault condition, the relative position may indicate that the elapsed time between pulses (or annular speed of the location of the shaft 116) meets and/or exceeds the maximum allowable rotation period or annular speed. Such operation may indicate the fault condition on the motive unit 114. On the other hand, the relative position may indicate that the elapsed time between pulses (or annular speed of the location of the shaft 116) is less than the maximum allowable rotation period or annular speed. This condition may indicate normal operation of the motive unit 114 and, thus, the method 200 will not detect the fault condition.

At stage 212, the method 200 can generate the command signal. Examples of the command signal can instruct the relay driver 150 to change the relay member 148 between the first state and the second state. The change in state can prevent the electrical signal from the first input/output 122. In turn, operation of the motive unit 114 will change to prevent and/or pre-empt build-up of thermal energy. These changes may alter operation of the motor, e.g., from the energized condition to the de-energized condition. The de-energized condition may correspond with no electrical signal impinging on the windings (or like components). As noted above, some embodiments herein may affect other alterations to the operation of the motive unit 114.

FIG. 5 illustrates a flow diagram of an example of the method 200 that can modulate the motor member 110 between the de-energized condition and the energized condition. This example is helpful to identify if, at all, the fault condition is cleared and/or the motor assumes normal operation.

The method 200 can include, at stage 214, initializing a second counter. The second counter can correspond to the duty cycle that measures a period of time between the energized condition and the de-energized condition of the motive unit 114. The method 200 can also include, at stage 216, comparing the second counter to a duty cycle threshold, which may be pre-scribed during the factory set-up or calibration noted above. The method 200 can also include, at stage 218, determining when the duty cycle satisfies the duty cycle threshold. This stage may quantify the relative position (e.g., greater than, less than, equal to, not equal to, etc.) between the value of the counter for the duty cycle and the duty cycle threshold. Before the duty cycle expires and/or satisfies the duty cycle threshold, the method 200 can include, at stage 220, maintaining the motor in the de-energized condition. On the other hand, when the duty cycle expires and/or satisfies the duty cycle threshold, the method 200 can continue, at stage 222, receiving a second signal that that relates to a measured temperature on the actuator 102. Examples of the measured temperature may correspond with the temperature of motor member 110, although other temperatures may be appropriate to characterize the thermal condition of the actuator 102 relative to the safety standards.

The method 200 can also include, at stage 224, comparing the measured temperature to a threshold temperature and, at stage 226, determining whether the measured temperature satisfies the threshold temperature. If affirmative, the method 200 can continue, at stage 214, to restart the counter. On the other hand, if the temperature does not satisfy the threshold temperature, then the method 200 can include, at step 228, receiving a third signal that corresponds with a measured travel of the actuator 102. The method 200 can also include, at stage 230, comparing the measured travel to a threshold travel, and at stage 232, determining whether the measured travel satisfies the threshold travel. The threshold travel for linear actuators may define a maximum position and/or a minimum position for the actuator member 112. In one implementation, if the actuator 102 is at the maximum position and/or the minimum position, the method 200 can include, at stage 234, awaiting additional operating instructions. When the measured travel is between the maximum position and the minimum position, the method 200 can continue, at stage 236, generating an output to change the motor from the de-energized condition to the energized condition and returning in one implementation to stage 202 (FIG. 4) to monitor operation of the motor member 110.

Figure 6:
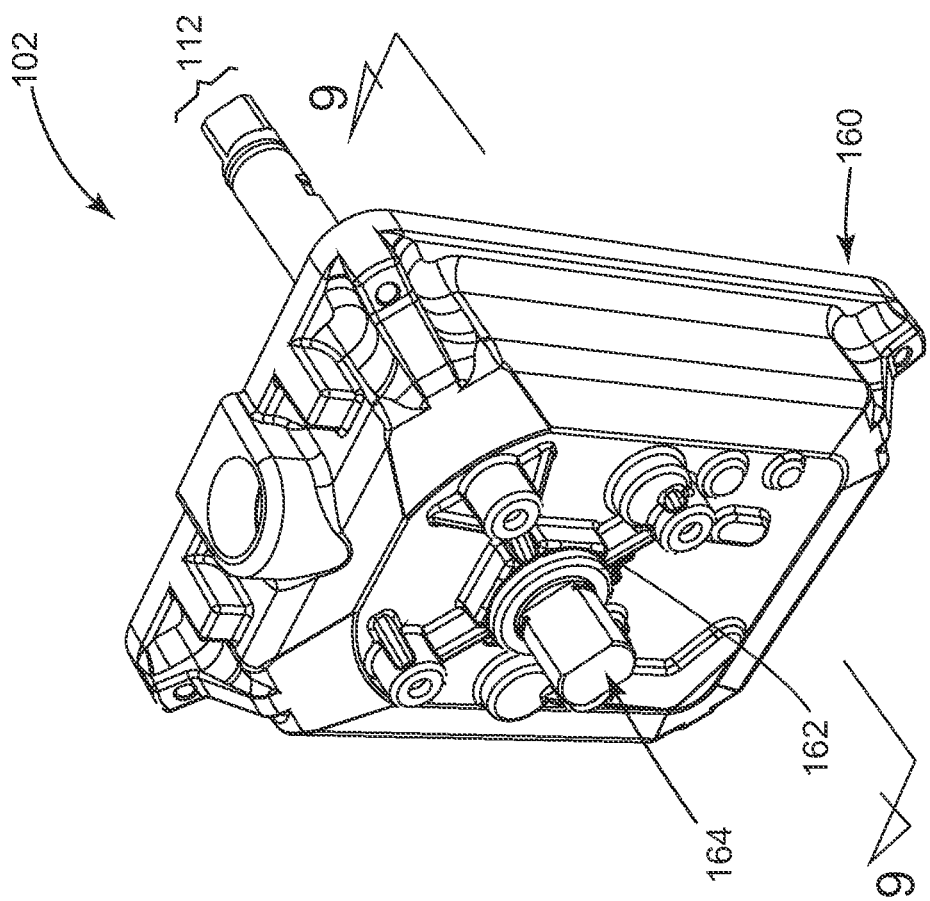
FIG. 6 depicts a perspective view of the front of an example of the actuator of FIG. 1 in partially-assembled form.
Figure 7:
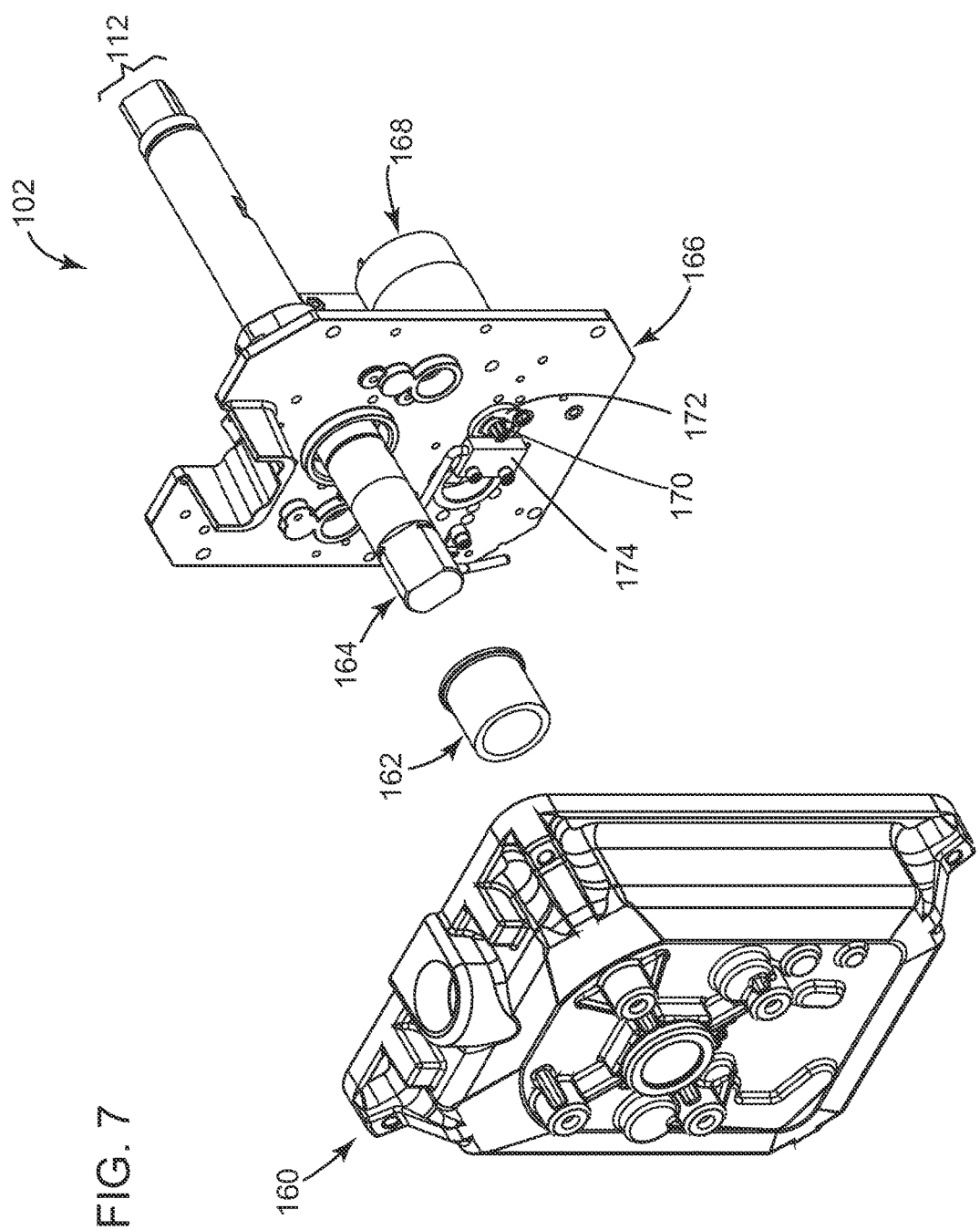
FIG. 7 depicts a perspective view of the front of an example of the actuator of FIG. 6 in partially-exploded form.
Figure 8:
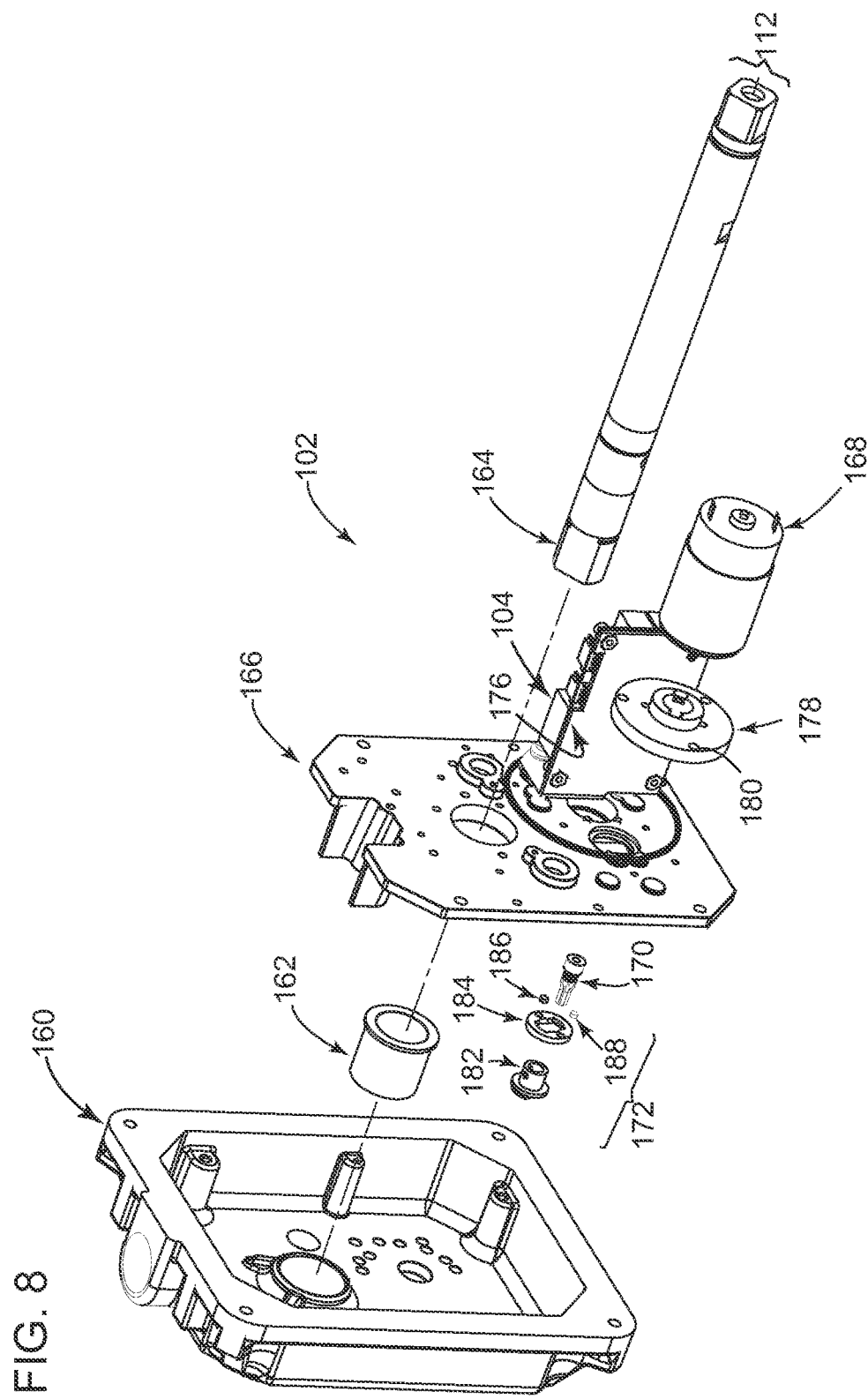
FIG. 8 depicts a perspective view of the back of an example of the actuator of FIG. 7 in partially-exploded form.
Figure 9:
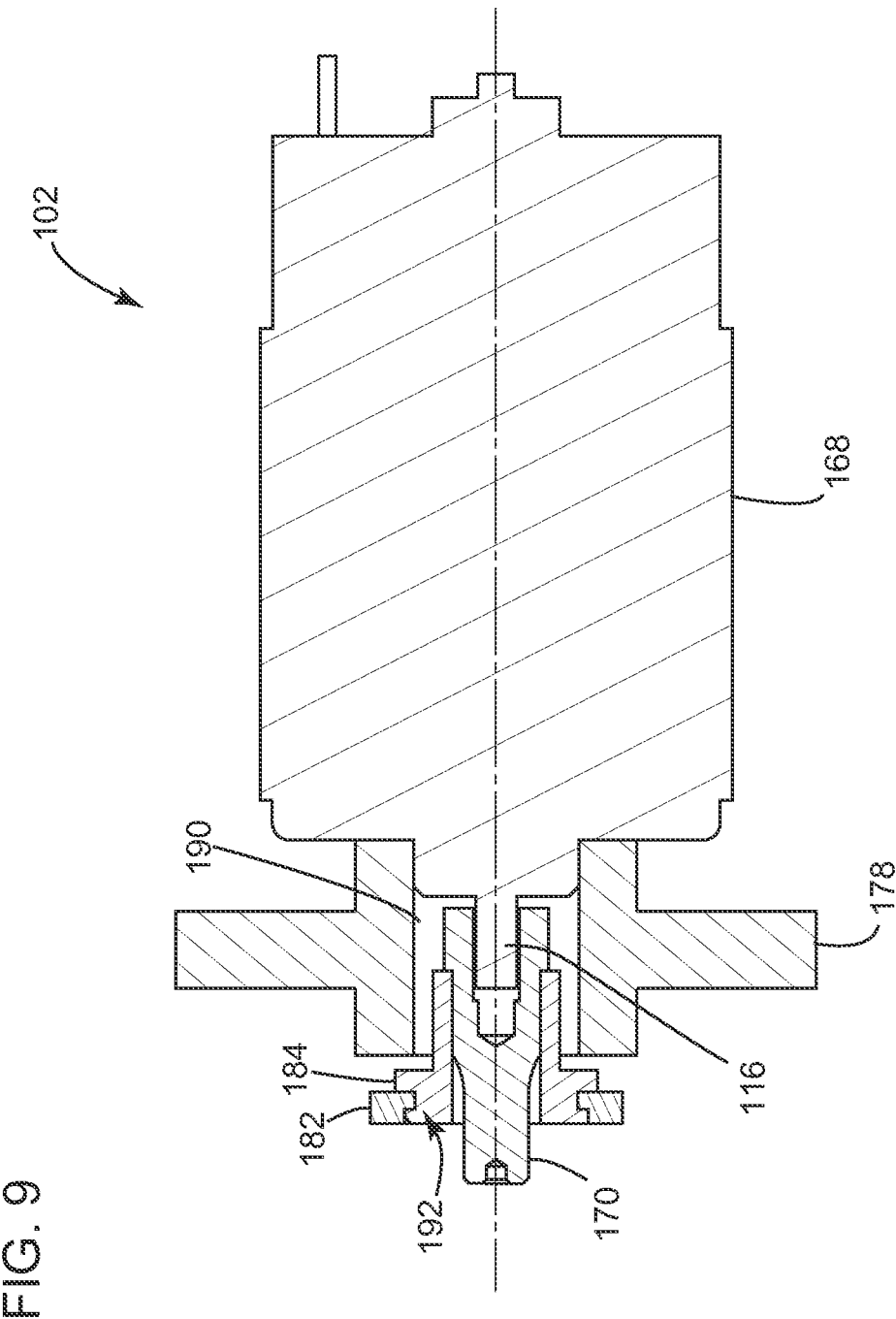
FIG. 9 depicts an elevation view of the cross-section an example of the actuator of FIG. 6 in partially-assembled form.

The discussion now turns to an implementation of the safety device 100. More specifically, FIGS. 6, 7, 8, and 9 illustrate various views of an example of the actuator 102. This example can generate rotary movement. In the views, the actuator 102 is shown with some members removed to enhance the clarity of the drawings and discussion herein. FIG. 6 illustrates a perspective view of the front of the actuator 102. FIG. 7 illustrates the actuator 102 of FIG. 6 in partially exploded form. FIG. 8 illustrates a perspective view of the back of the actuator 102 in partially-exploded form. FIG. 9 depicts an elevation view of the cross-section of the actuator 102 taken at line 9-9 of FIG. 6.

Referring first to FIG. 6, the housing of the actuator 102 can include a cover assembly that forms a protective enclosure to secure the components of the device. The housing can have one or more cover members (e.g., first cover member 160), each being constructed to interface with one or more of the others to form the protective enclosure. The cover members 160 may be made of materials that are resistant to corrosion and deterioration from the ambient environment. A bushing 162 may insert into the cover members 160 to receive a shaft 164 that operates as the actuator member 112 in the actuator 102. The bushing 162 may be arranged with bearings and/or lubricants to minimize rotary friction of the shaft 164 relative to the cover members 160. The shaft 164 has an end that extends through the cover members 160. This end can couple with other collateral parts that are required and/or designated to move to create useful work. In this way, rotation of the shaft 164 will realize movement in the collateral parts, e.g., to open and close a valve (not shown).

FIG. 7 shows the front of the actuator 102 in partially exploded form. The housing may enclose a plate member 166 with features to receive, support, and fasten various members of the actuator 102. The plate member 166 can be a generally flat and/or planar sheet of metal with features (e.g., threaded and non-threaded openings). The members of the actuator 102 may include a small electric (DC or AC) motor 168. In one implementation, the electric motor 168 can rotate a geared member 170 that extends through the plate member 166. Although not shown, the actuator 102 may include a transmission assembly (e.g., one or more coupled gears) that couples the geared member 170 to the shaft 164. The sensor member 106 may include an adapter 172 that is moveable relative to a switch 174. In relation to the prior discussion of FIGS. 1, 2, and 3, the adapter 172 and the switch 174 operate as the first sensor component 130 and the second sensor component 132, respectively. The switch 174 can affix to the plate member 166 using one or more suitably fashioned fasteners (e.g., screws). The adapter 172 can couple with the motor 168.

FIG. 8 shows the back of the actuator 102 in partially exploded form. The control processor 104 may reside on a bracket 176 that affixes to the plate member 166. Fasteners with appropriate insulation may be useful to isolate the control processor 104 from electric shocks and/or related static discharge. The motor 168 may secure to a motor mount 178 in lieu of directly coupling with the plate member 166. In one implementation, the motor mount 178 can include peripheral openings 180 to allow fasteners (e.g., screws) to mate with corresponding threaded openings on the motor 168. The motor mount 178 may also be configured to interface with the plate member 166 in order to reduce and/or dampen vibrations and other physical disturbances that can frustrate operation of the actuator 102. Located in front of the plate member 166, the adapter 172 may include a first body 182, a second body 184, and one or more magnets (e.g., a first magnet 186 and a second magnet 188). The magnets 186, 188 can couple with the second body 184. In use, operation of the motor 168 will change the position of the magnets 186, 188 relative to the switch 174 (FIG. 7) to modulate the signals that are useful to determine the annular translation of the shaft 116, as noted herein.

The cross-section of FIG. 9 illustrates the parts of the actuator 102 shown in FIG. 8 in assembled form. Moving from right to left in the diagram, the motor 168 inserts into a bore 190 on the motor mount 178. The geared member 170 inserts onto the shaft 116. The first body 182 can insert onto the geared member 170. One or more set screws or like implements may be used to securely affix the geared member 170 to the shaft 116 and the first body 182. This configuration can avoid slippage and/or relative movement that can, at least, introduce error into the calculated values for the annular translation of the shaft 116. As also shown in FIG. 9, the bodies 182, 184 can couple with one another at an interface 192. Examples of the interface 192 can prevent relative axial, longitudinal, and rotation movement between the bodies 182, 184. For axial and longitudinal movement, the interface 192 can form a snap-fit to connect the bodies 182, 184. The interface 192 may also be useful to retain the magnets 186, 188 (FIG. 8) inside of the second body 184.

Figure 10:
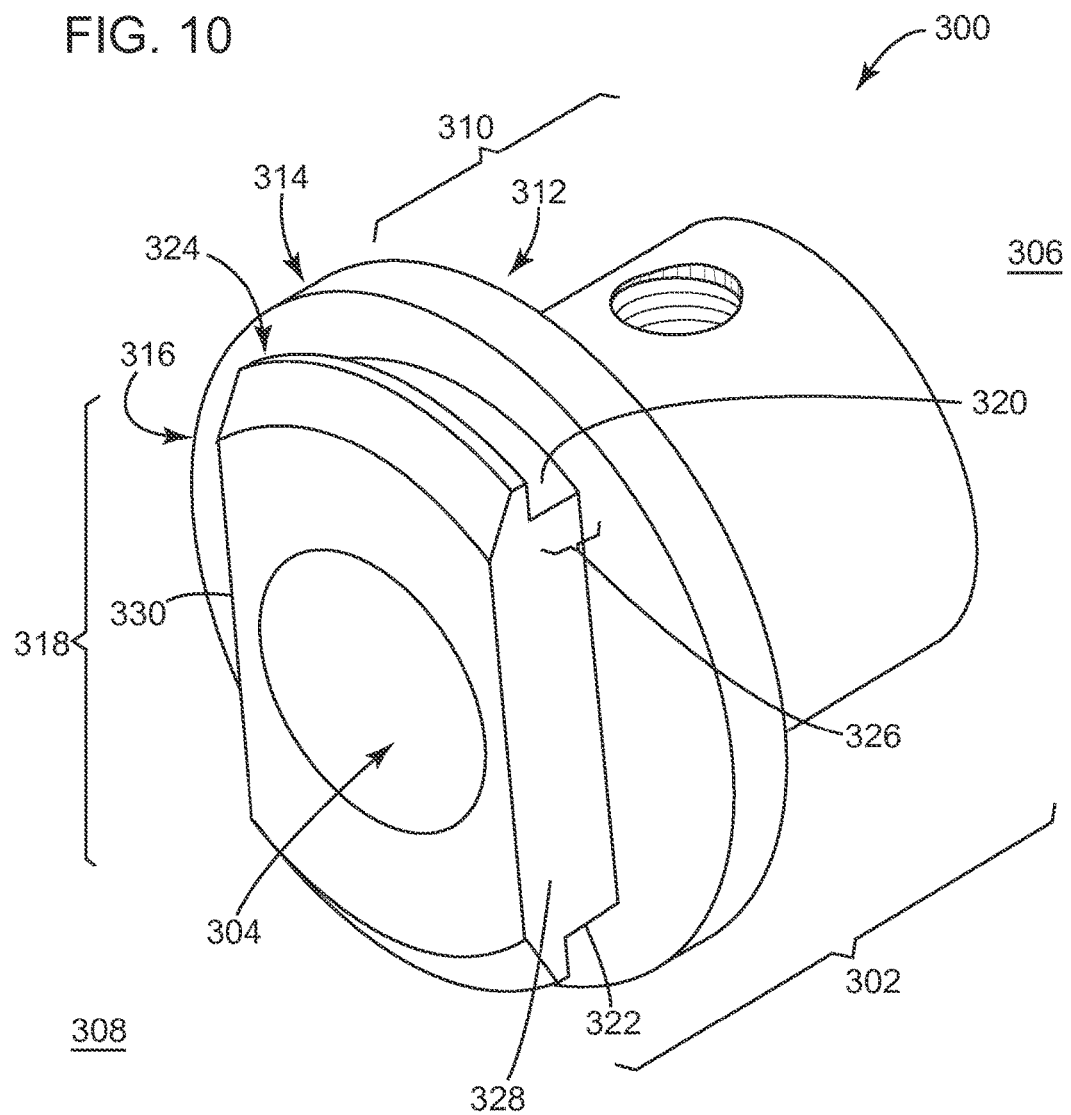
FIG. 10 depicts a perspective view of the front of an example of a first member of an adapter that can secure to the motive unit of FIG. 1.
Figure 11:
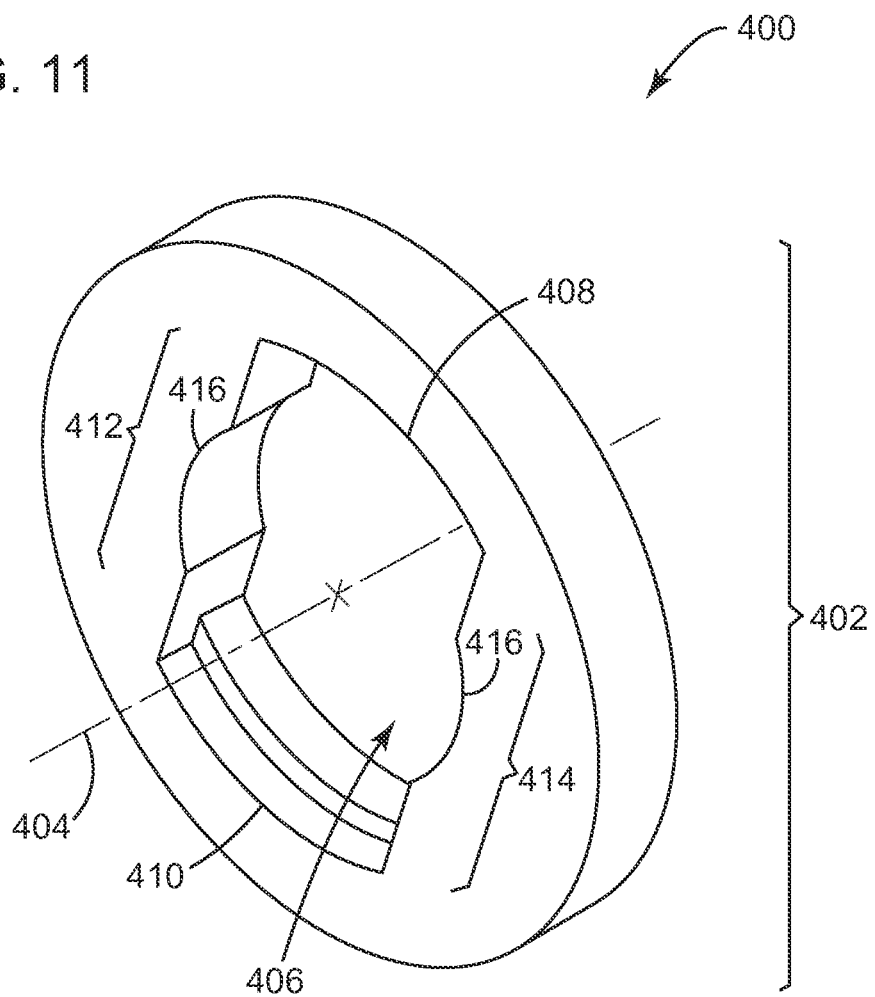
FIG. 11 depicts a perspective view of the front of an example of a second member of the adapter that can secure to the motive unit of FIG. 1.
Figure 12:
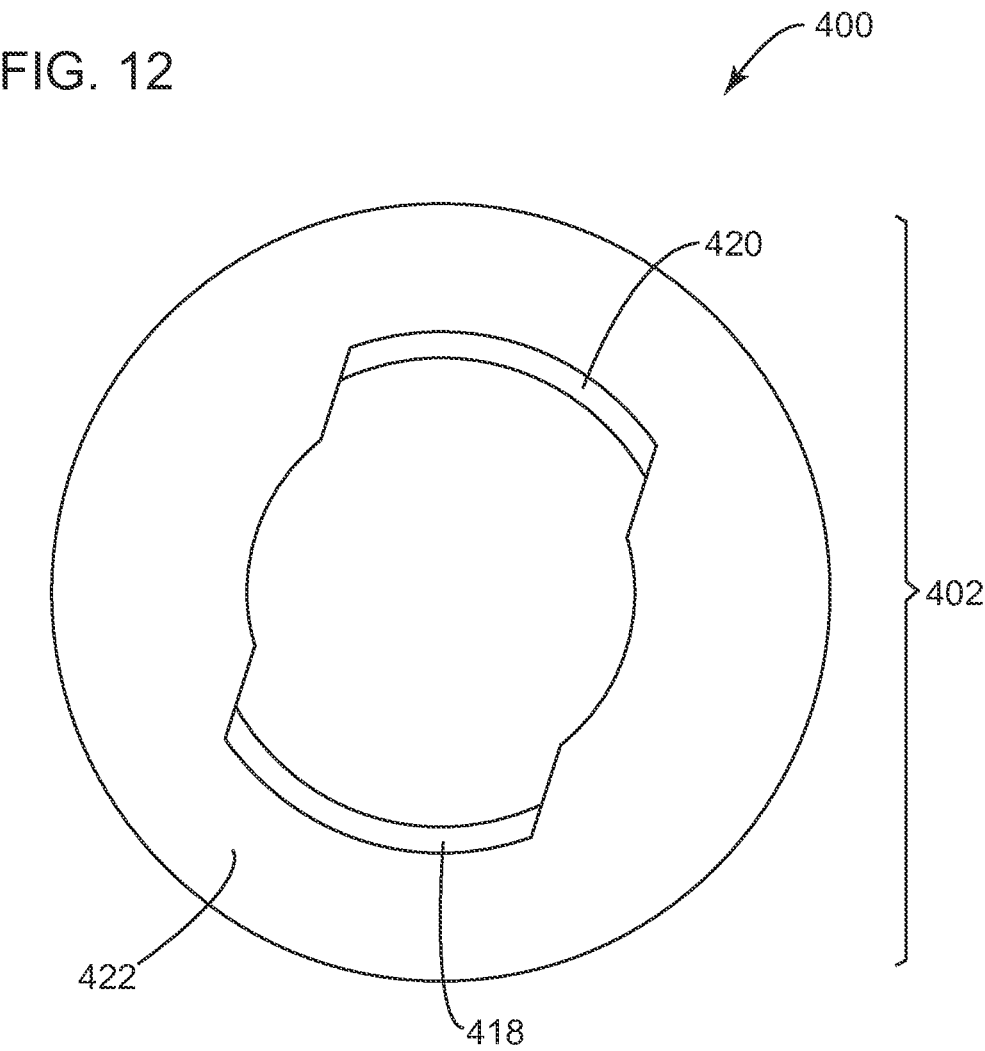
FIG. 12 depicts an elevation view of the front of an example of the second member of the adapter that can secure to the motive unit of FIG. 1.
Figure 13:
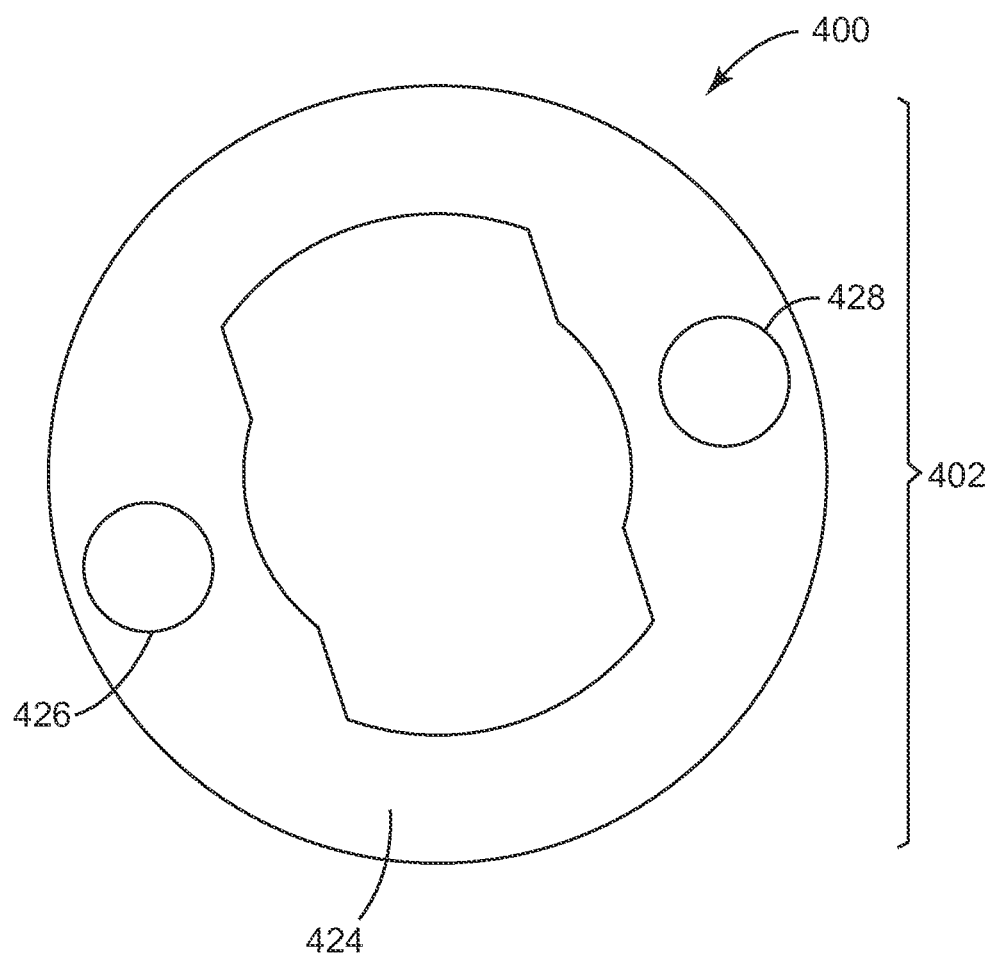
FIG. 13 depicts an elevation view of the back of an example of the second member of the adapter that can secure to the motive unit of FIG. 1.
Figure 14:
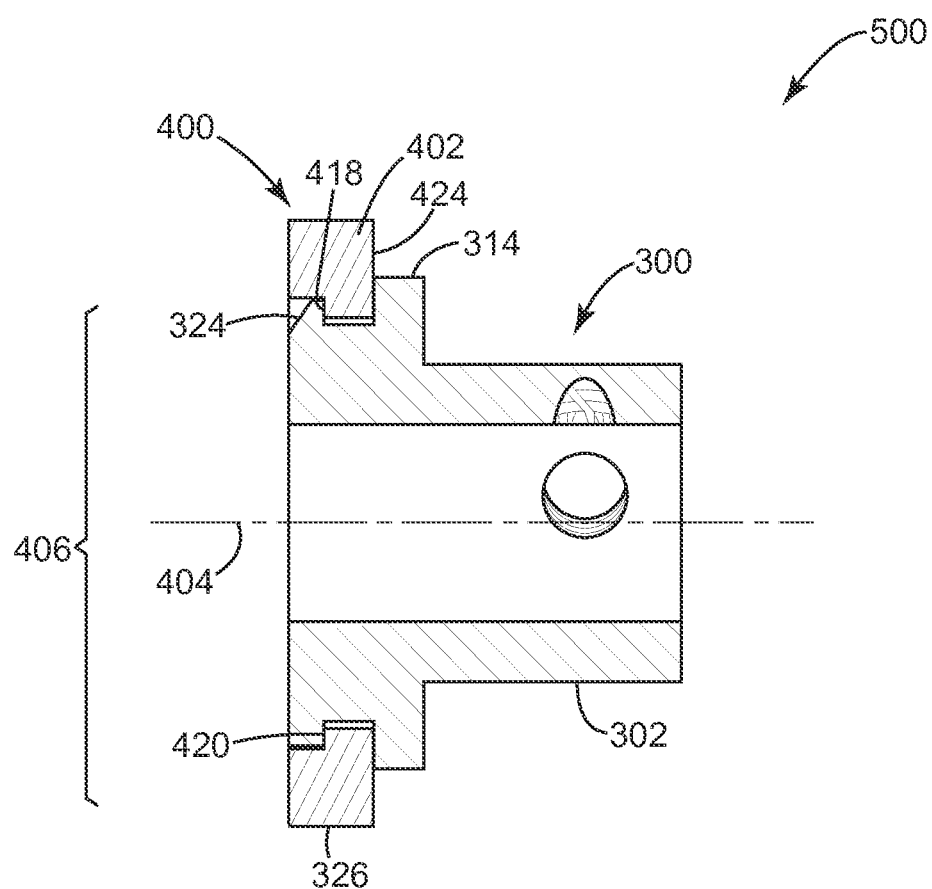
FIG. 14 depicts an elevation view of the cross-section of an example of an adapter using the first member and the second member of FIGS. 10, 11, 12, and 13.

The discussion now follows with examples of the construction and implementation of the adapter 172. FIG. 10 depicts a perspective view of the front of an example of a first adapter member 300. FIGS. 11, 12, and 13 depict various views of an example of a second adapter member 400. FIG. 14 depicts an elevation view of the cross-section of an example of the adapter member 500 with the first adapter member 300 coupled with the second adapter member 400.

FIG. 10 illustrates an example of a first adapter member 300. This example may have a first body 302 in the form of, generally, an elongated cylinder with a central aperture 304. The first body 302 may be molded or cast from composites (e.g., plastics), although metals and/like hardened materials may be used to form the features discussed herein. Moving from the back 306 to the front 308 of the first body 302, the first body 302 can include a first section 310 in which the cylinder has a first diameter. The first section 310 couples with a first side 312 of a flange portion 314. In the flange portion 314, the cylinder may have a second diameter that is larger than the first diameter. On the second side 316 of the flange portion 314, the first body 302 may include a first interface member 318 with a pair of arcuate surfaces (e.g., a first arcuate surface 320 and a second arcuate surface 322). The arcuate surfaces 320, 322 may extend from the flange portion 314 to an interface shoulder 324 that is spaced apart from the flange portion to form an interface gap 326. The cylinder may have a third diameter at the interface shoulder 324 that is larger than the diameter of the cylinder as measured between the arcuate surfaces 320, 322. In one example, the arcuate surfaces 320, 322 may partially circumscribe the central aperture 304, terminating at a pair of flat, radial surfaces (e.g., a first radial surface 328 and a second radial surface 330), which are spaced apart from one other on either side of the central aperture 304.

FIGS. 11, 12, and 13 illustrate an example of the second adapter member 400. This example has a second body 402 in the form of a thin, round disc with a center axis 404. The second body 402 may have a key-way opening 406 that is disposed centrally in the disc. The key-way opening 406 may have a profile that defines a pair of arcuate ends (e.g., a first arcuate end 408 and a second arcuate end 410). The profile may also include a pair of elongated sides (e.g., a first elongated side 412 and a second elongated side 414) that connect to the arcuate ends 408, 410. The sides 412, 414 may each feature a radial portion 416 where the profile of the key-way opening 406 diverges radially away from the center axis 404 of the disc. On the front, as shown in the front view of FIG. 12, the key-way opening 406 can form a pair of surfaces (e.g., a first surface 418 and a second surface 420) that are recessed from a front surface 422 of the disc. On the back, as shown in FIG. 13, the second body 402 can have back surface 424 with a pair of apertures (e.g., a first aperture 426 and a second aperture 428). The apertures 426, 428 can be circular, although the shape and depth may be selected to accommodate the magnets 186, 188 (FIG. 8).

FIG. 14 illustrates an example of an adapter 500 that includes the adapter members 300, 400. In one example, first adapter member 300 can insert into the key-way opening 406 from the back to the front of the second body 402 (also, from right to left in the diagram of FIG. 14). The interface gap 326 is devised so that the opposing surfaces of the flange portion 314 and the interface shoulder 324 contact the second adapter member 400 at the surfaces 418, 420 and the back surface 424, respectively. This configuration secures the first adapter member 300 in the recessed key-way opening 406 to prevent relative movement with respect to the second adapter member 400. As noted above, the flange portion 314 extends radially outwardly from the center axis 404 to overlap with the apertures 426, 428 (FIG. 13). This feature may secure the magnets 186, 188 (FIG. 8) in the second body 402. The entire adapter 500 can fit onto the geared member 170 (FIG. 9) to rotate the magnets 186, 188 (FIG. 8) in response to operation of the motor 168 (FIG. 9).

In light of the foregoing discussion, the disclosed subject matter describes a safety device that can regulate temperature of an actuator. The embodiments can detect faulty operation of the actuator, often using operating data that relates directly to movement (e.g., annular translation) of a shaft of an electric motor that translates the actuating member to do useful work. A technical effect is to generate an output that corresponds with a de-energized state for the electric motor. This de-energized state can prevent the build-up of excess heat that can increase the temperature on the actuator in excess of acceptable levels for use of the actuator in hazardous areas and/or in connection with flammable, combustible materials.

As used herein, an element or function recited in the singular and proceeded with the word "a" or "an" should be understood as not excluding plural said elements or functions, unless such exclusion is explicitly recited. Furthermore, references to "one embodiment" should not be interpreted as excluding the existence of additional embodiments that also incorporate the recited features. To the extent that the claims recite "at least one of X and Y" (or any similar phrase) this is intended to include "one or both of X and Y" and is not limited to "at least one X and at least one Y."

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An actuator, comprising:
a first shaft having a first position and a second position;
a motor with a second shaft coupled with the first shaft;
a sensor disposed in proximity to the second shaft and in a position so that the operating data tracks an annular translation of a location on the second shaft;
a control processor coupled with the sensor and with the motor via a switch; and
a counter coupled with the control processor, wherein the counter is configured to measure a duty cycle,
wherein the control processor is configured to:
receive a signal from the sensor that conveys operating data that relates to rotation of the second shaft,
use the operating data to identify a fault condition of the motor,
change the switch from a first state to a second state in response to the fault condition,
activate the counter in response to the fault condition,
change the state of the switch from the second state to the first state in response to expiration of the duty cycle, and
change the motor from a first operating state to a second operating state in response to the switch, wherein the second state corresponds with the second operating state of the motor.

2. The actuator of claim 1, wherein the sensor is configured to rotate with the second shaft.

3. The actuator of claim 1, wherein the sensor has a first component and a second component, at least one of which secures to the second shaft and interacts with the other to induce the signal.

4. The actuator of claim 1, further comprising a bushing that rotates with the second shaft, wherein the sensor couples with the bushing.

5. The actuator of claim 1, wherein the first operating state is an energized condition and the second operating state is a de-energized condition.

6. The actuator of claim 1, wherein the control processor is further configured to,
use the operating data to determine an annular speed for the second shaft, and
compare the annular speed to a threshold speed, wherein the fault condition corresponds with a value for the annular speed that deviates from the threshold speed.

7. The actuator of claim 1, wherein the signal from the sensor comprises a first signal and a second signal, and wherein the control processor is configured to,
determine an elapsed time between the first signal and the second signal, and
compare the elapsed time to a rotation threshold, wherein the fault condition corresponds with a value for the elapsed time that deviates from the rotation threshold.

8. The actuator of claim 1, wherein the sensor comprises a pair of magnets.

9. The actuator of claim 1, further comprising a power supply coupled to the motor via the switch.

10. An actuator, comprising:
a first shaft having a first position and a second position;
a motor with a second shaft;
a sensor coupled with a location on the second shaft, wherein the sensor is configured to generate a signal that defines operating data that relates to an annular translation of the second shaft; and
a safety device coupled with the motor, the safety device comprising an input/output coupled with the motor and a switch coupled with the input/output, the switch having a first state and a second state, one each that allows an electrical signal to impress on the input/output and that prevents the electrical signal to impress on the input/output,
wherein the signal from the sensor comprises a first signal and a second signal, and
wherein the safety device is configured to,
track the annular translation of the location on the second shaft,
determine a fault condition of the motor that relates to the annular translation by
determining an elapsed time between the first signal and the second signal, and
comparing the elapsed time to a rotation threshold, wherein the fault condition corresponds with a value for the elapsed time that deviates from the rotation threshold, and
change the state of the switch from the first state to the second state in response to the fault condition.

11. The actuator of claim 10, wherein the annular translation quantifies an annular speed for the location on the second shaft.

12. The actuator of claim 10, wherein the sensor is configured to rotate with the second shaft.

13. The actuator of claim 10, wherein the sensor has a first component and a second component, at least one of which secures to the second shaft and interacts with the other to induce the signal.

14. The actuator of claim 10, wherein the control processor is further configured to,
use the elapsed time to calculate annular speed of the second shaft, and
compare the annular speed to a threshold speed, wherein the fault condition corresponds with a value for the annular speed that deviates from the threshold speed.

15. The actuator of claim 10, further comprising a bushing that couples the sensor to the second shaft.

16. The actuator of claim 10, further comprising a power supply coupled to the motor via the switch.

17. A method, comprising:
at a controller having a processor with access to executable instructions for:
tracking an annular translation for a location on a shaft of a motor;
detecting a fault condition of the motor that relates to the annular translation;
changing a switch from a first state to a second state in response to the fault condition;
starting a counter in response to the fault condition;

changing the switch from the second state to the first state in response to the counter reaching a duty cycle value, and changing the motor from an energized condition to a de-energized condition in response to the fault condition, wherein the second state corresponds with the de-energized condition of the motor.

18. The method of claim 17, further comprising:

receiving a signal that conveys operating data that relates to the annular translation; and using the operating data to calculate the annular translation.

19. The method of claim 17, comparing an elapsed time for the shaft to rotate with a rotation threshold, wherein the fault condition corresponds with a value for the elapsed time that deviates from the rotation threshold.

20. The method of claim 17, calculating rotation speed of the shaft for one complete rotation, wherein the fault condition corresponds with a value for the rotation speed that deviates from an allowable annular speed.

* * * * *